(12) United States Patent
Virchow

(10) Patent No.: US 6,969,995 B2
(45) Date of Patent: Nov. 29, 2005

(54) MEASURING DEVICE FOR IGNITION VOLTAGES

(76) Inventor: Florian Virchow, Weingarten 7a, Celle (DE) 29223

( * ) Notice: Subject to any disclaimer, the term of this patent is extended or adjusted under 35 U.S.C. 154(b) by 0 days.

(21) Appl. No.: 10/236,059

(22) Filed: Sep. 5, 2002

(65) Prior Publication Data

US 2004/0046562 A1     Mar. 11, 2004

(51) Int. Cl.[7] ............................................. F02P 17/00
(52) U.S. Cl. ...................... 324/380; 324/399
(58) Field of Search ....................... 324/380, 378, 324/393, 399, 402, 388, 382

(56) References Cited

U.S. PATENT DOCUMENTS

| | | | |
|---|---|---|---|
| 4,349,782 A * | 9/1982 | Doss ........................... | 324/390 |
| 5,444,376 A | 8/1995 | Dittmann et al. ........... | 324/402 |
| 5,461,315 A | 10/1995 | Kraus ......................... | 324/388 |
| 5,461,316 A * | 10/1995 | Maruyama et al. ......... | 324/402 |
| 5,487,676 A * | 1/1996 | Maruyama et al. ......... | 439/125 |

FOREIGN PATENT DOCUMENTS

WO      WO 93/02286 A1      2/1993

* cited by examiner

Primary Examiner—Anjan Deb
Assistant Examiner—Timothy J. Dole
(74) Attorney, Agent, or Firm—Hedman & Costigan, P.C.

(57) ABSTRACT

The invention relates to a measuring device with a sensor (4) for monitoring the ignition voltage of an associated cylinder of an internal combustion engine, said sensor (4) being arranged along the ignition conductor (12), between the spark plug and the ignition coil. The sensor (4) is a bar-shaped probe which is arranged parallel to the axis of the ignition conductor (12), at a flashover-proof distance. The invention further relates to a measuring arrangement comprising such measuring devices.

7 Claims, 2 Drawing Sheets

MEASURING DEVICE FOR IGNITION VOLTAGES

Figure 1:
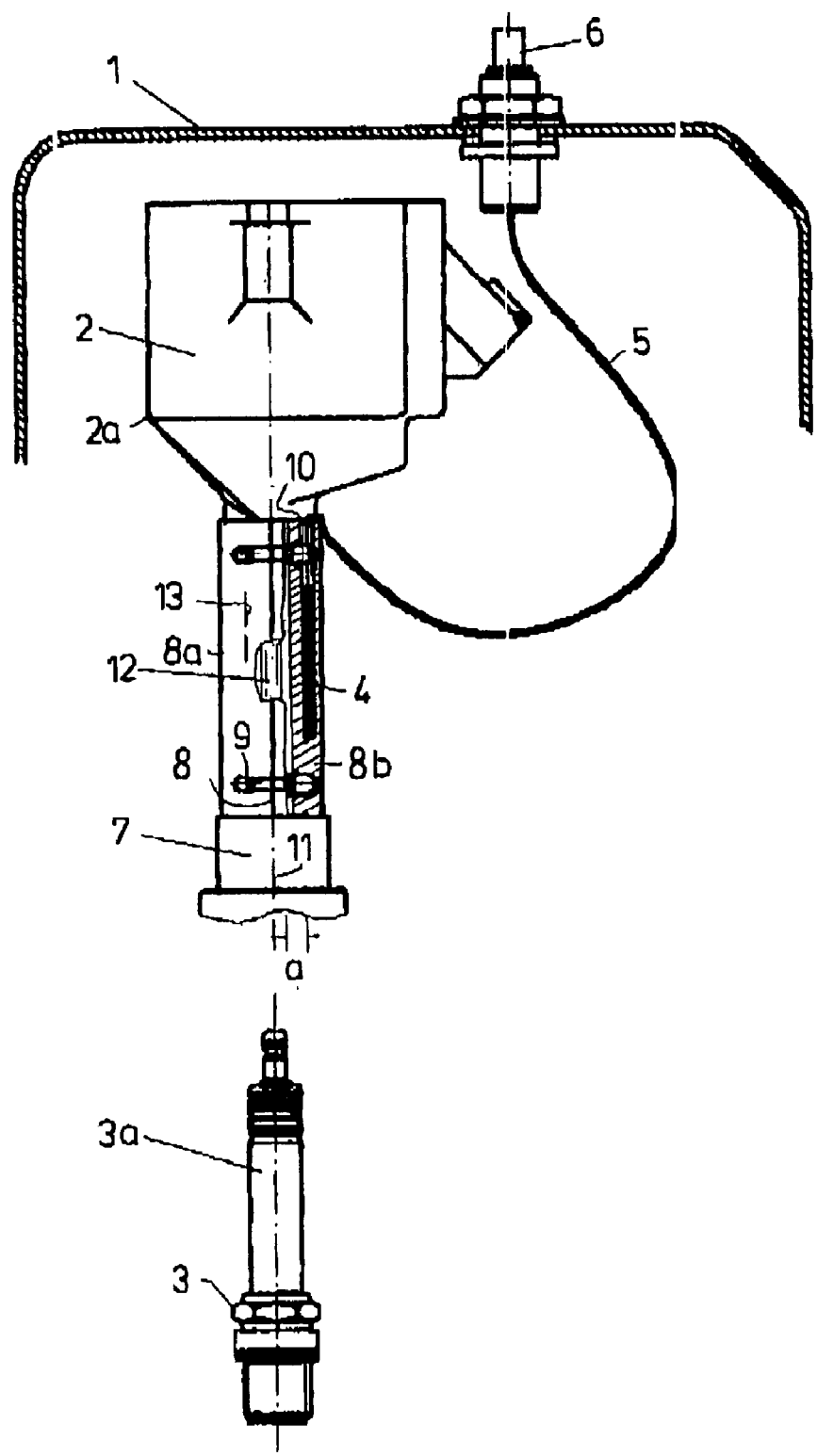

The invention relates to a measuring device, arranged at an ignition conductor, comprising a sensor for monitoring the ignition voltage of an internal combustion engine, and to a measuring arrangement comprising such measuring devices.

From WO 93/02286-A1, a measuring device is known which, by means of an inductive pick-up, acquires measured values which correspond to the ignition current. From these measured values, electrical signals are formed which make it possible for conclusions to be drawn regarding the operating behaviour of the spark plug.

From DE 92 16 908-U1, a measuring device is known in which measured values are generated in a copper disk which is galvanically separate from the ignition conductor, said copper disk surrounding said ignition conductor. Measuring signals, which can be tapped off and which correlate with the current flowing in the ignition conductor, are generated from these measured values.

Inductive pickup of the signal is sensitive to parasitic induction and voltage flashovers. The high tension experienced requires sufficient spacing, or sufficient insulation respectively. However, as the spacing increases, the signals are increasingly subjected to parasitic induction. For this reason, values measured by probes in disk-shape or plate-shape (see e.g. DE 40 40 236-A1) are unsatisfactory.

It is thus the object of the invention to provide a measuring device which handles the inductive signal transmission more favourably, and in which measuring device the sensor requires less space so as to be able to be placed in close proximity to the spark plug.

According to the invention, this object is met by a measuring device according to claim 1. Preferred embodiments are set out in the subordinate claims.

By way of a sensor, the measuring device according to the invention comprises a bar-shaped probe which is arranged parallel to the axis of the ignition conductor, at a flashover-proof distance. The distance is preferably between 12 and 14 mm, particularly preferably between 12.9 and 13.3 mm. Preferably, the probe comprises the following dimensions which are not dependent on each other: length 10 to 80 mm, preferably 40 to 50 mm; thickness 2 to 5 mm, preferably 2.5 to 3.5 mm.

The bar-shaped probe preferably comprises a square profile, and, furthermore, is preferably made of copper or a copper alloy, in particular brass.

The sensor is always arranged in the region between the spark plug (if need be including up to approximately the spark plug thread on the engine block) and the ignition coil, so that the actual ignition voltage which has been upward transformed is measured. Particularly preferably, the sensor is arranged in close proximity to the spark plug and (independently of this) particularly preferably underneath the valve cover.

A further embodiment of the invention provides for the sensor to be guided in the wall of an insulator which at least partially surrounds the ignition conductor. The insulator is preferably designed as an insulating material sleeve which in its wall comprises a longitudinal borehole that is parallel to the axis, into which longitudinal borehole the bar-shaped censor is inserted so as to provide a precise fit. A borehole in the sleeve-shaped insulator can be made so as to be exactly parallel to the axis, with the insulator continuing to allow, by way of its contact surface with the ignition conductor, installation which is parallel to the axis of said ignition conductor.

For ease of installation and in particular for subsequent installation in the case of a retrofit or exchange, a further embodiment of the invention provides for the insulator to comprise two half-shells, which together, seen in top view, need not necessarily form a complete circular area, with said half shells being disconnectably interconnected, for example by means of two screws made of an insulating material. In this way, the insulator with the sensor is easy to install.

A further embodiment of the invention provides for the insulator to be arranged on an extension of the ignition coil body, in the direction towards the spark plug, so as to be parallel to the axis in the spark plug extension, or alternatively on the spark plug shank.

A further embodiment of the invention provides for the insulator to comprise an insulating plastic, such as in particular Teflon®, Hyperflon® or ceramics. Advantageously, the sensor is permanently arranged at the ignition conductors of all spark plugs of an internal combustion engine; preferably underneath the valve cover, wherein it is further preferred if the sensor connection is arranged on the valve cover, so as to lead the measuring line out from the valve cover space.

Figure 2:
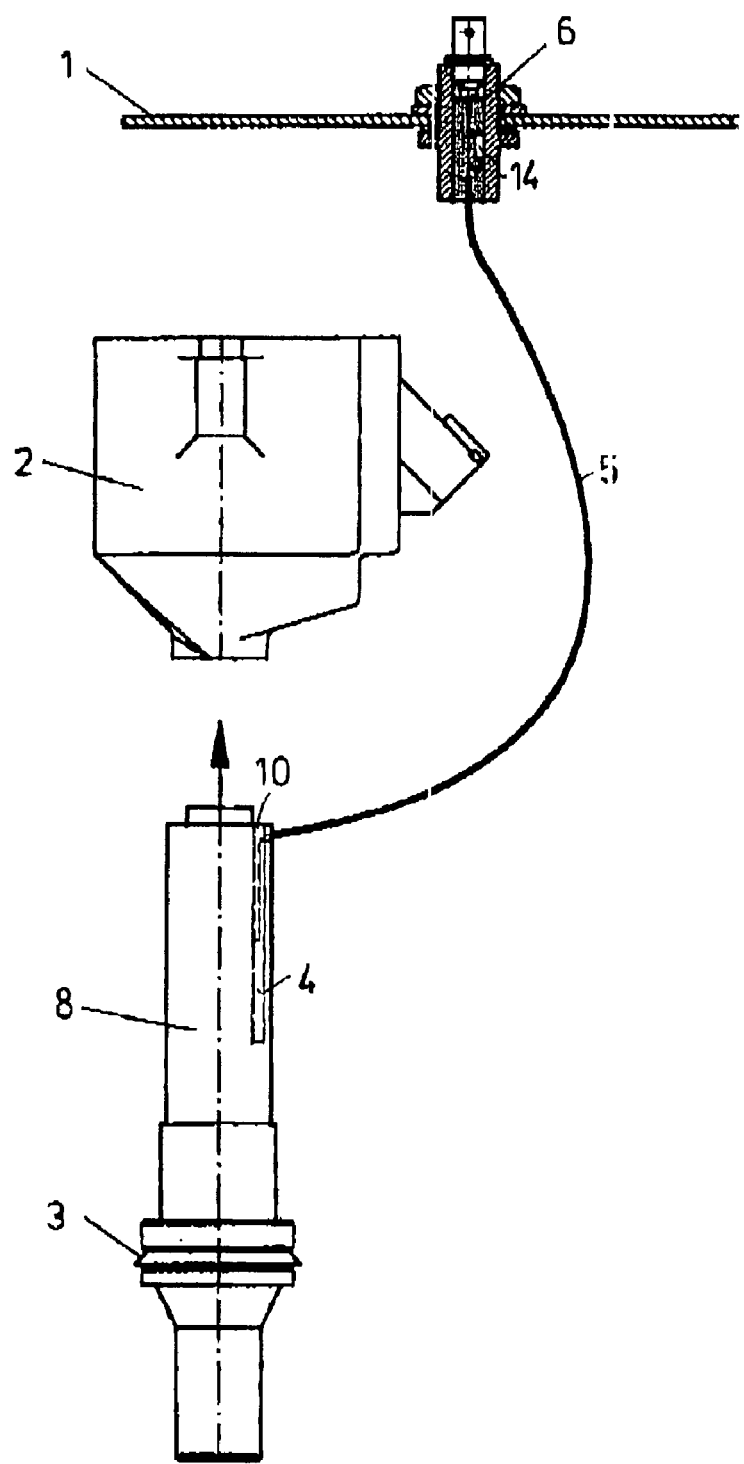

The invention is explained in more detail by means of the drawings:

FIG. 1 shows an insulating material sleeve with a sensor, said insulating material sleeve being arranged on an extension of the ignition coil. The insulating material sleeve comprises a borehole, parallel to the axis, with a bar-shaped probe being inserted into said borehole; and FIG. 2 shows the sensor arranged on a spark plug extension with a borehole parallel to the axis, into which borehole the bar-shaped sensor 4 is inserted.

FIG. 1 shows a partial section view of the valve cover 1 of an internal combustion engine. The internal combustion engine (not shown) comprises several drive cylinders (also not shown). The drawing shows an ignition coil 2 and a spark plug 3 for operating one of the drive cylinders. The ignition coil 2 generates an ignition current which is fed to the spark plug 3 at a high tension of 10–50 kV.

The operating states of the spark plugs 3 of all cylinders are monitored to detect whether all cylinders are operating properly or whether a cylinder may have failed.

To effect such monitoring, one measuring device is used for each drive cylinder. The measuring device comprises a sensor 4 which is connected to a measuring connection 6 via a connection line 5.

The arrangement of the sensor 4 is particularly important. An ignition coil housing 2a comprises a cylindrical ignition coil extension 7. Attached to this ignition coil extension 7 is an insulating plastic sleeve 8 which comprises two shell halves 8a and 8b. The two shell halves 8a and 8b are interconnected, for example by means of plastic screw connections 9. Shell half 8b comprises a borehole 10 which extends parallel to the axis 11 of the ignition coil extension 7 and the ignition line 12.

The sensor 4 is inserted into the borehole 10. This sensor 4 is bar shaped; it can be made from copper, brass or another electrically conductive material. The sensor 4 is connected to the measuring connection 6 by way of the connection line 5.

The spacing between the sensor 4 and the ignition line 12 is important. The sensor 4 is bonded into the borehole 10, with a specified spacing a, between said sensor and the ignition cable 11. Said spacing is the same for all sensors of the internal combustion engine.

It would also be possible to insert the sensor 4 for example only into an exterior groove of the wall 13 of the insulating sleeve 8, so as to obtain spacing a for achieving suitable measured values. It is always important that voltage flashover proofness is ensured in each case.

During operation, the ignition cable extension 7 is plugged onto the spark plug 3. If an ignition current flows into the spark plug, then said ignition current provides a measuring signal by way of induction. This measuring signal reaches the measuring connection 6 by way of the connection line 5. A connected oscilloscope can tap off and display the signal or signals. Preferably, the signal is capacitively decoupled as a voltage. For this purpose, a condenser is arranged, e.g. in the measuring connection 6.

It is also possible to convert the signals to light displays and to automatically display a respective operating state by means of diodes or other luminous signals.

FIG. 2 shows a modification of the design of the measuring arrangement. In this case, the plastic sleeve 8 is a spark plug extension which sits on the shank of the spark plug 3 (not shown). The sensor is arranged so as to be permanently affixed to the spark plug extension. Measurements are taken in the same way as with the embodiment according to FIG. 1.

The section view of the measuring connection 6 shows a condenser 14 which makes possible capacitive tapping off of the measuring signals.

What is claimed is:

1. A measuring device for monitoring the ignition voltage of an associated cylinder or an internal combustion engine, wherein a sensor is arranged along an ignition conductor, between the spark plug and the ignition coil, wherein said sensor is a bar-shaped probe that is arranged parallel to the axis of the ignition conductor, at a flashover-proof distance, and wherein said sensor is guided in the wall of an insulator that surrounds said ignition conductor, and wherein the insulator is designed as an insulating material sleeve which in its wall comprises a longitudinal borehole that is parallel to the axis, into which longitudinal borehole said sensor is inserted so as to be firmly seated.

2. The measuring device according to claim 1, characterized in that said insulator comprises two half-shells that are disconnectably interconnected.

3. The measuring device according to claim 1, characterized in that said insulator comprises an insulating plastic.

4. A measuring arrangement, comprising measuring devices according to claim 1, on all spark plugs of the internal combustion engine.

5. The measuring arrangement or measuring device according to claim 4, characterized in that the internal combustion engine is gas-operated.

6. The measuring device according to claim 1, characterized in that said sensor is permanently arranged underneath a valve cover of the internal combustion engine.

7. The measuring device according to claim 1, characterized in that said sensor is essentially surrounded on all sides by an insulating material and, optionally is safeguarded by a sealing material and/or an adhesive material.

* * * * *